US008693188B2

(12) United States Patent
Holman, IV et al.

(10) Patent No.: US 8,693,188 B2
(45) Date of Patent: Apr. 8, 2014

(54) PIVOTABLE DISPLAY GUIDE MECHANISM FOR AN ELECTRONIC MOBILE DEVICE (75) Inventors: Martin Earl Holman, IV, West Palm Beach, FL (US); Bruce Alan Ivanik, Boca Raton, FL (US); Douglas Wayne Moskowitz, Weston, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 391 days.

(21) Appl. No.: 13/114,533

(22) Filed: May 24, 2011

(65) Prior Publication Data
US 2012/0300373 A1 Nov. 29, 2012

(51) Int. Cl.
*H05K 5/00* (2006.01)
*H05K 7/00* (2006.01)
*G06F 1/16* (2006.01)
*H04M 1/00* (2006.01)

(52) U.S. Cl.
USPC .............. 361/679.56; 361/679.26; 361/679.3; 361/679.55; 455/575.1; 455/575.4

(58) Field of Classification Search
USPC ............... 361/679.3, 679.56, 679.26, 679.55; 455/575.1, 575.4
See application file for complete search history.

(56) References Cited

U.S. PATENT DOCUMENTS

| 7,050,767 | B2 | 5/2006 | Hickey et al. |
| 7,092,246 | B2* | 8/2006 | Tanaka et al. ............ 361/679.27 |
| 7,117,564 | B2 | 10/2006 | Jeong |
| 7,159,833 | B2 | 1/2007 | Kato |
| 7,184,805 | B2 | 2/2007 | Cho et al. |
| 7,376,450 | B2 | 5/2008 | Chen |
| 7,419,099 | B2 | 9/2008 | Lee et al. |
| 7,478,972 | B2* | 1/2009 | Takamori et al. .......... 403/409.1 |
| 7,492,893 | B2 | 2/2009 | Ahn et al. |
| 7,496,194 | B2 | 2/2009 | Jeun |
| 7,496,389 | B2 | 2/2009 | Cho et al. |
| 7,529,571 | B2 | 5/2009 | Byun et al. |
| 7,546,150 | B2 | 6/2009 | Makino |
| 7,567,830 | B2 | 7/2009 | Hur |
| 7,577,466 | B2 | 8/2009 | Kim |
| 7,580,734 | B2 | 8/2009 | Ahn et al. |
| 7,624,477 | B2 | 12/2009 | Chien et al. |

(Continued)

FOREIGN PATENT DOCUMENTS

| EP | 1926291 A2 | 5/2008 |
| EP | 2202948 A1 | 6/2010 |

(Continued)

OTHER PUBLICATIONS

European Patent Office, Extended European Search Report, Application No. 11167770.4, Sep. 27, 2011.

(Continued)

*Primary Examiner* — Anthony Haughton
(74) *Attorney, Agent, or Firm* — Quarles & Brady LLP (57) ABSTRACT

An electronic mobile device includes a base that defines a guide path and a translation support that is pivotally supported by the base. The electronic mobile device further includes a movable assembly translatably connected to the translation support opposite the base. The movable assembly includes a guide follower that follows the guide path. As such, the movable assembly translates relative to the translation support as the movable assembly and the translation support pivot relative to the base to move the movable assembly to a plurality of operating configurations relative to the base.

16 Claims, 10 Drawing Sheets

(56) References Cited

U.S. PATENT DOCUMENTS

| | | | |
|---|---|---|---|
| 7,930,008 B2 * | 4/2011 | Ko | 455/575.4 |
| 8,165,648 B2 * | 4/2012 | Higashigawa et al. | 455/575.3 |
| 8,380,257 B2 * | 2/2013 | Jeong et al. | 455/575.1 |
| 2004/0203527 A1 | 10/2004 | Matsumoto | |
| 2005/0137000 A1 | 6/2005 | Toh et al. | |
| 2007/0293283 A1 | 12/2007 | Inubushi et al. | |
| 2008/0096619 A1 | 4/2008 | Kuga et al. | |
| 2008/0125201 A1 * | 5/2008 | Kim et al. | 455/575.4 |
| 2008/0188268 A1 * | 8/2008 | Kim et al. | 455/566 |
| 2008/0242380 A1 | 10/2008 | Kajihara et al. | |
| 2009/0036181 A1 | 2/2009 | Lee | |
| 2009/0186663 A1 | 7/2009 | Griffin et al. | |
| 2010/0178963 A1 | 7/2010 | Iwaki | |
| 2010/0216512 A1 | 8/2010 | Aghaei et al. | |
| 2010/0248796 A1 * | 9/2010 | Higashigawa et al. | 455/575.4 |

FOREIGN PATENT DOCUMENTS

| | | |
|---|---|---|
| EP | 2320627 A1 | 5/2011 |
| WO | WO2006034949 A1 | 4/2006 |
| WO | WO2007069834 A1 | 6/2007 |
| WO | WO2007137448 A1 | 12/2007 |
| WO | WO2008108594 A1 | 9/2008 |
| WO | 2010050463 A1 | 5/2010 |

OTHER PUBLICATIONS

LG VX9400—Full Review—Reviews by PC Magazine, Review Date: Mar. 23, 2007.

U.S. Appl. No. 12/758,382, Handheld Electronic Communication Device Including Touch-Sensitive Display, filed Apr. 12, 2010.

* cited by examiner

PIVOTABLE DISPLAY GUIDE MECHANISM FOR AN ELECTRONIC MOBILE DEVICE

CROSS-REFERENCE TO RELATED APPLICATION

Not applicable.

STATEMENT OF FEDERALLY SPONSORED RESEARCH OR DEVELOPMENT

Not applicable.

BACKGROUND OF THE DISCLOSURE

The present disclosure generally relates to electronic mobile devices, and more particularly to electronic mobile devices including mechanisms that facilitate motion of a display to landscape and portrait operating configurations relative to a base.

Some types of electronic mobile devices, such as cellular phones and the like, include displays that are movable by a device user relative to another portion of the device. Such movable displays are provided for various reasons. For example, some displays are slidable to an extended operating configuration to reveal a key assembly supported on a base of the device. As another example, some displays are pivotable to provide a landscape operating configuration that is more convenient for certain activities, such as viewing digital videos.

Some electronic mobile devices even include displays that are first pivotable to a landscape operating configuration and then an extended operating configuration. In some cases, a normally-hidden key assembly is accessible in both the landscape operating configuration and the extended operating configuration. However, these types of devices have several shortcomings. For example, the mechanisms that facilitate motion of the display are typically complex because the display cannot move to comfortable landscape and extended operating configurations by simply pivoting about a single axis. In particular, some of these mechanisms cause the display to pivot using multiple translating pivot points. As another example, some of these mechanisms bias the display to some, but not all, of the display's operating configurations. As such, if the user releases the display before reaching the desired operating configuration, the display can move back to the previous operating configuration. This can lead to frustration if the user perceives the device as unnecessarily difficult to move to the desired operating configuration.

DETAILED DESCRIPTION OF THE DRAWINGS

According to some embodiments, an electronic mobile device includes a base that defines a guide path and a translation support that is pivotally supported by the base. The electronic mobile device further includes a movable assembly translatably connected to the translation support opposite the base. The movable assembly includes a guide follower that follows the guide path. As such, the movable assembly translates relative to the translation support as the movable assembly and the translation support pivot relative to the base to move the movable assembly to a plurality of operating configurations relative to the base.

The teachings of the present disclosure relate generally to electronic mobile devices, e.g., mobile communication devices such as pagers, cellular phones, global positioning system (GPS) navigation devices and other satellite navigation devices, smart phones, wireless organizers, wireless personal digital assistants (PDA), and tablet computers. The electronic mobile devices could be devices without wireless communication capabilities such as PDAs, electronic gaming devices, digital photograph albums or picture frames, digital cameras, or digital video recorders. It is also possible that the teachings of the present disclosure could be applied to electronic devices other than handheld electronic devices, e.g., notebook computers. In any case, these examples are intended to be non-limiting.

Figure 3:
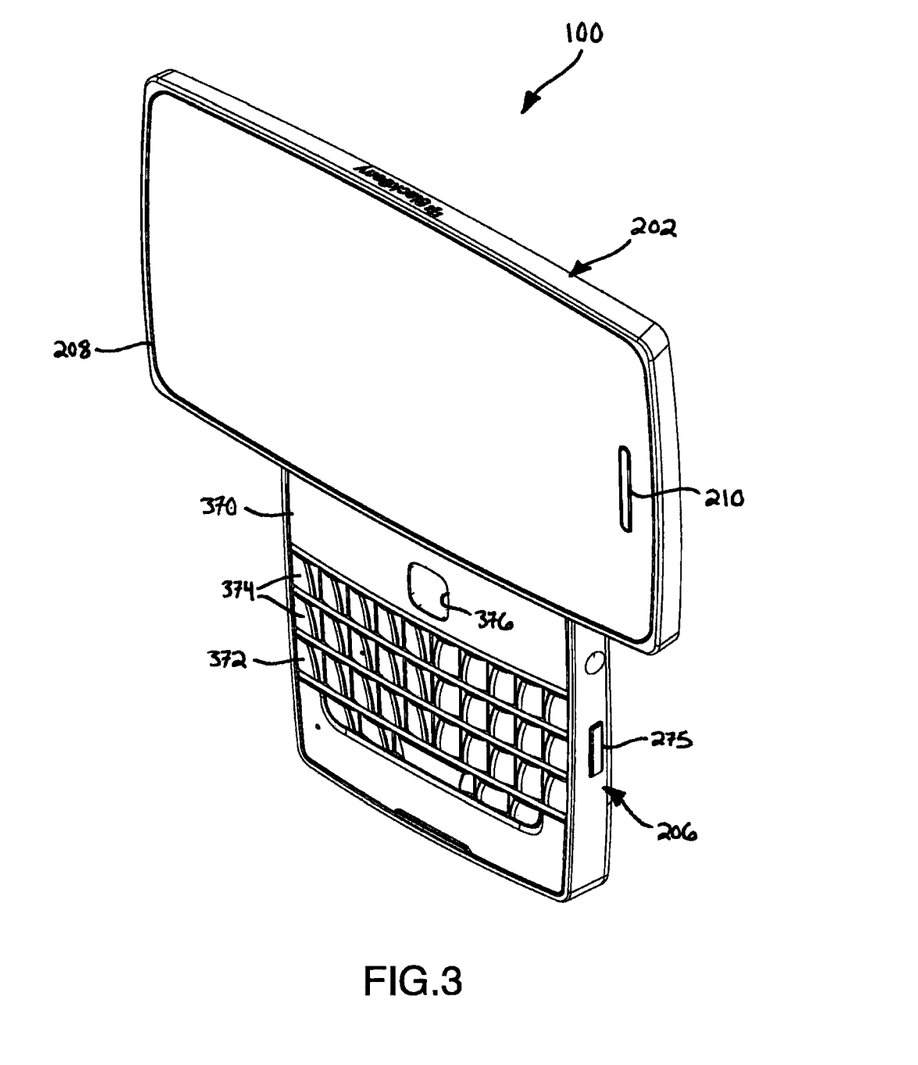
FIG. 3 is a front perspective view of the electronic mobile device of FIG. 2 in a landscape operating configuration.
Figure 4:
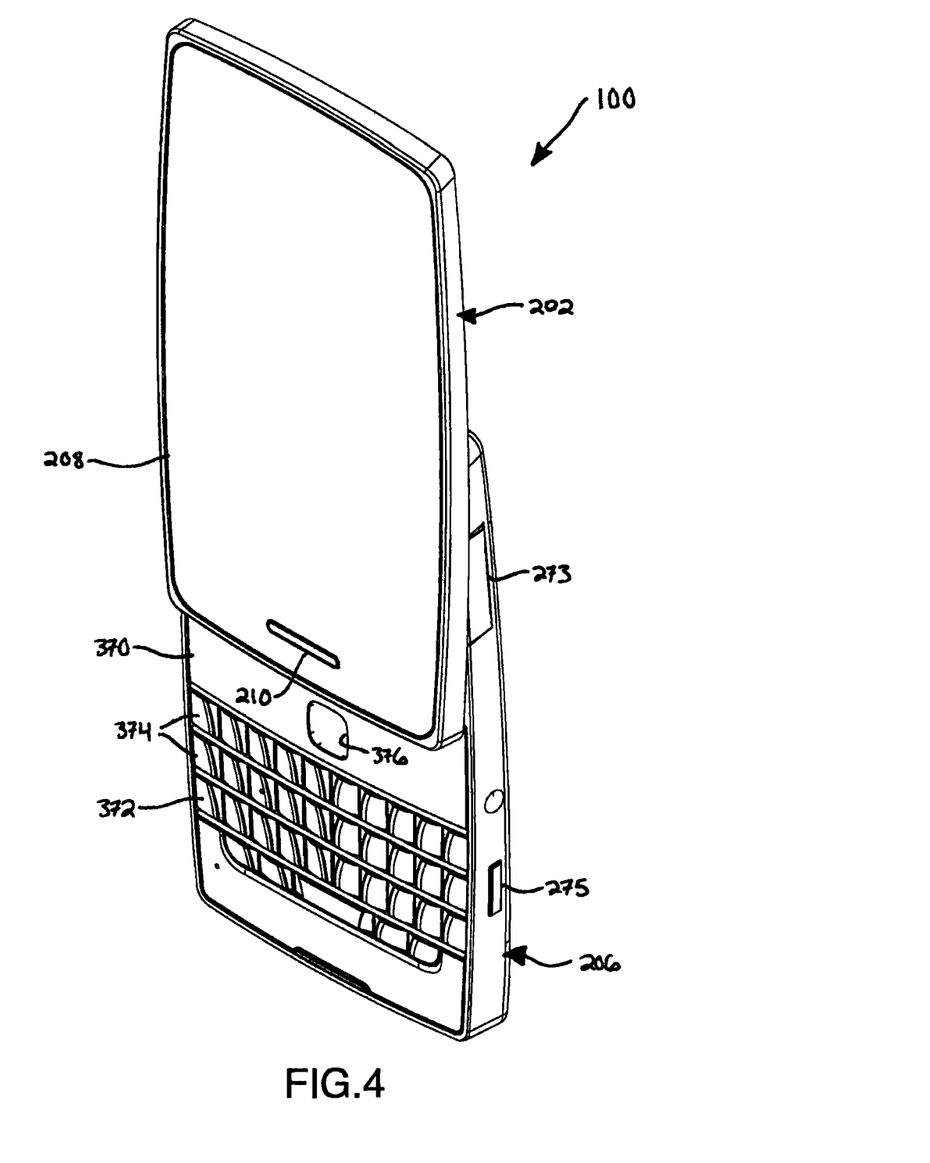
FIG. 4 is a front perspective view of the electronic mobile device of FIG. 2 in an extended operating configuration.
Figure 5:
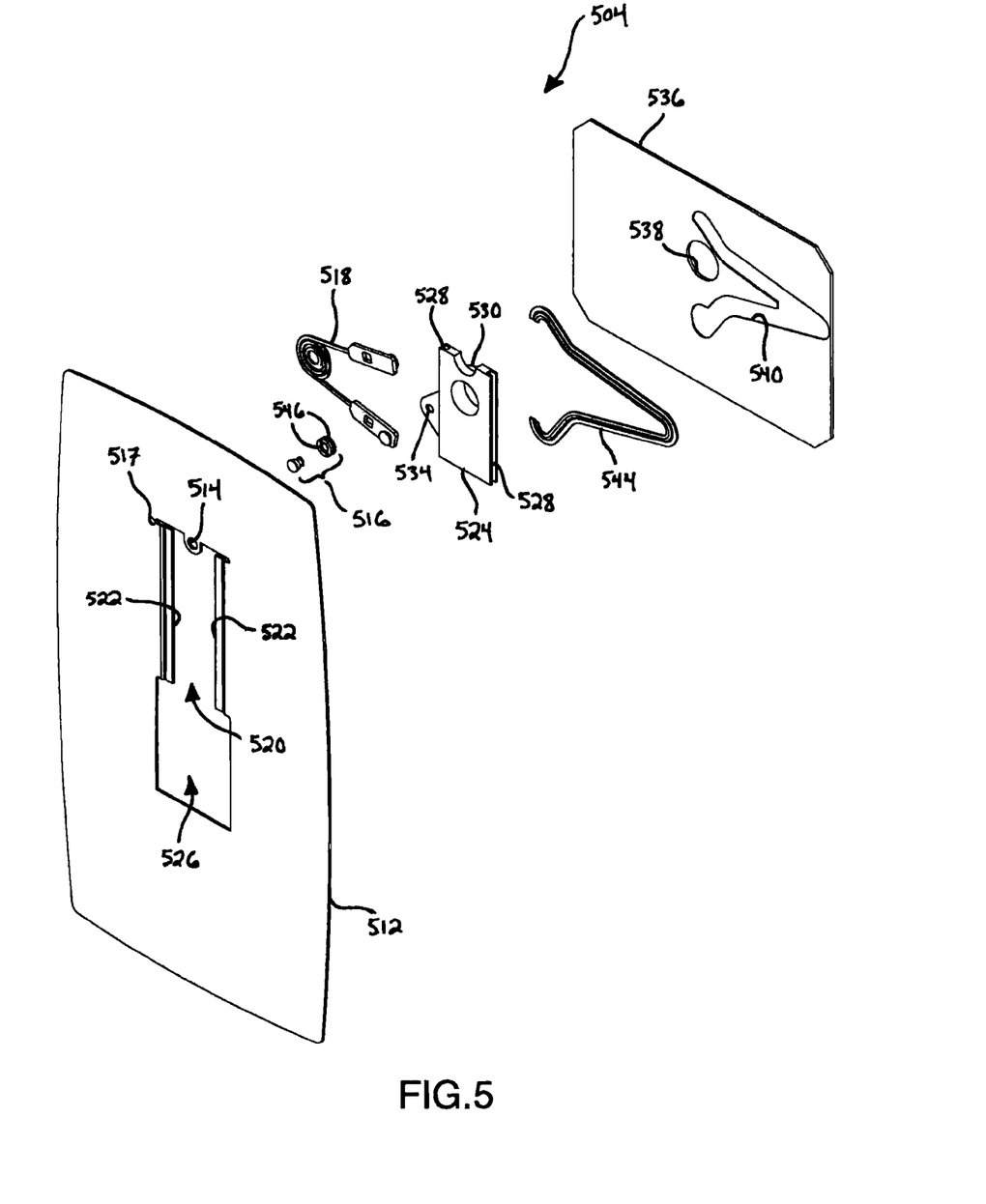
FIG. 5 is an exploded front perspective view of the electronic mobile device of FIG. 2 showing a guide mechanism.

Referring generally to FIGS. 2-10, an electronic mobile device 100 includes a movable assembly 202 that is supported by a guide mechanism 504 (FIG. 5). The guide mechanism 504 permits the movable assembly 202 to move to and from several operating configurations relative to a base 206 connected to the guide mechanism 504 opposite the movable assembly 202. In particular, the movable assembly 202 moves from a compact operating configuration (FIG. 2) to a landscape operating configuration (FIG. 3) and vice versa and from the landscape operating configuration to an extended operating configuration (FIG. 4) and vice versa. Unlike previous designs, the guide mechanism 504 is a relatively simple structure that biases the movable assembly 202 toward each of the operating configurations over at least some of the pivotal range of motion of the movable assembly 202. In the following paragraphs, the movable assembly 202, the guide mechanism 504, and the base 206, are first described in further detail. Thereafter, exemplary tasks that may be performed in the compact, landscape, and extended operating configurations are described. Finally, communication elements and subsystems of the device 100 are described.

Figure 1:
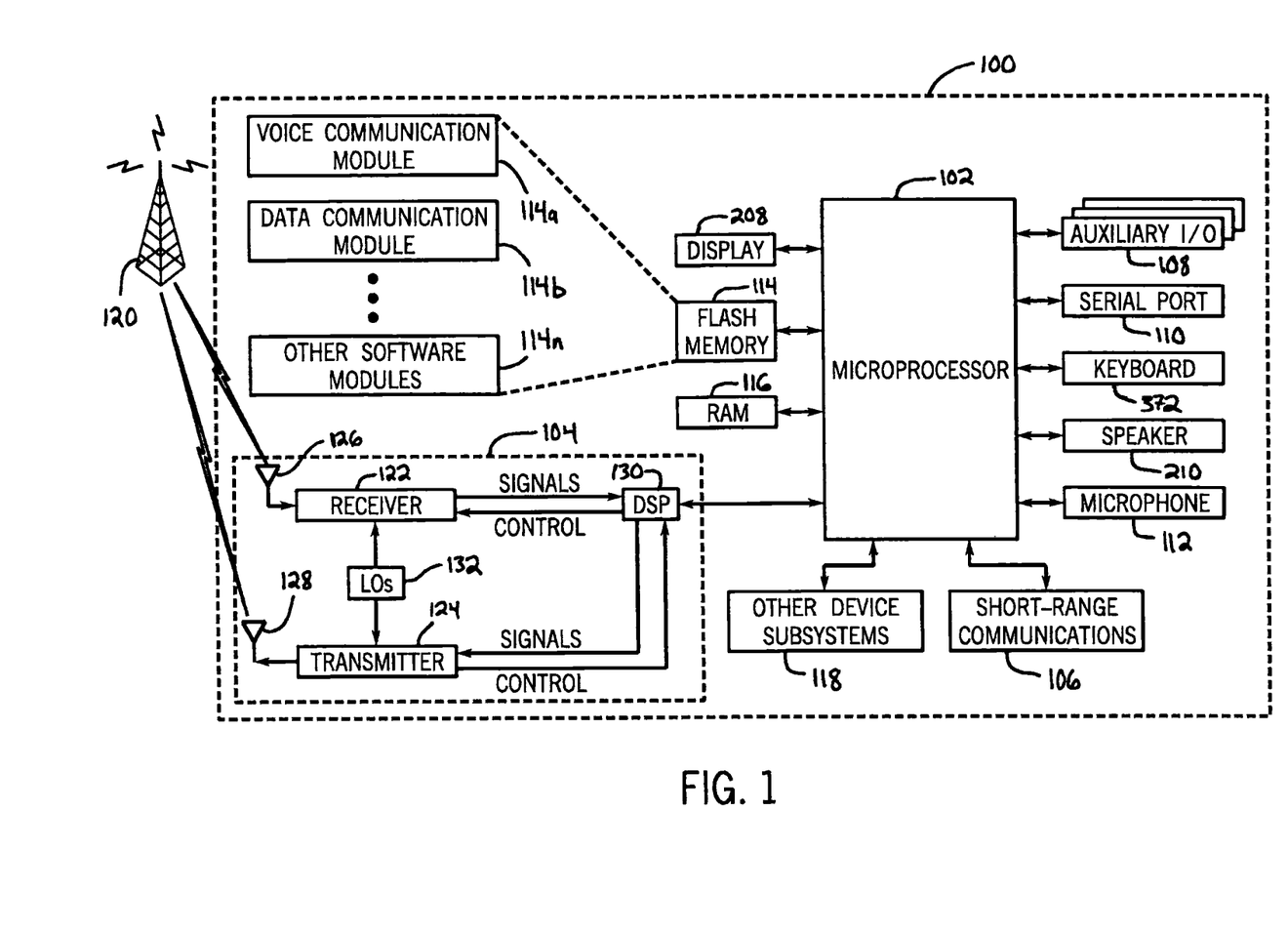
FIG. 1 is a block diagram of communication elements and subsystems of an electronic mobile device according to the present disclosure.
Figure 2:
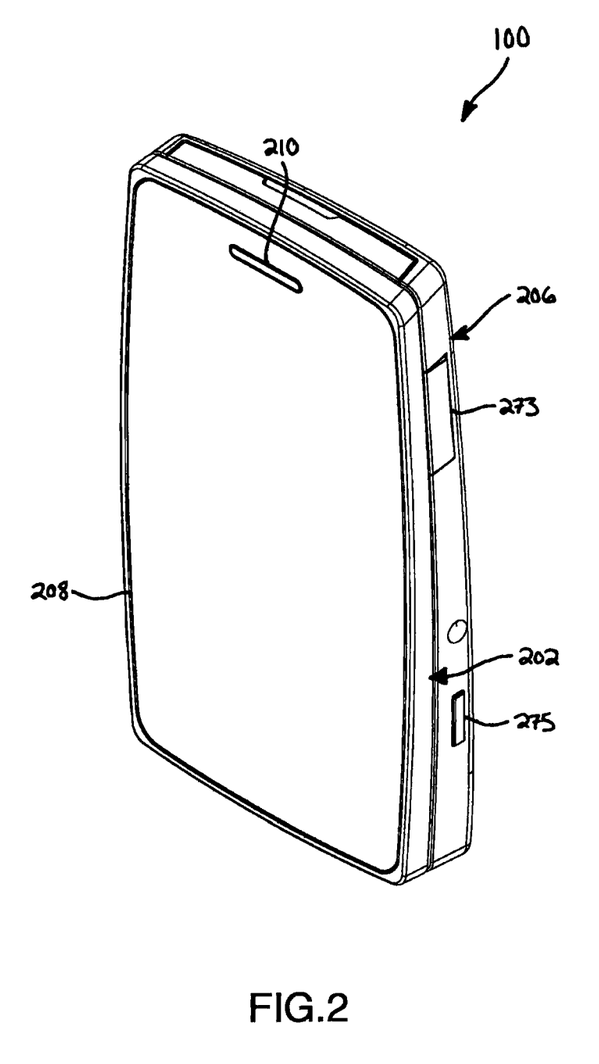
FIG. 2 is a front perspective view of an electronic mobile device according to the present disclosure in a compact operating configuration.

Referring now to FIGS. 2-4, the movable assembly 202 is a generally flat component that includes a front-facing user interface device, e.g., a display 208, such as a liquid crystal display (LCD). The display 208 interacts with the communication elements and subsystems described in connection with FIG. 1 to provide visual information to a user. In some embodiments, the display 208 could be a touch-responsive LCD panel such that the movable assembly 202 could also serve as an input device. In other embodiments, the user interface device could be a key assembly, an optical input device (e.g., an optical trackpad), combinations of these devices with one another or with a display, or the like.

In some embodiments, the movable assembly 202 also supports a speaker 210 that interacts with the communication elements and subsystems described in connection with FIG. 1 to provide audible information to a user. Furthermore, in some embodiments the movable assembly 202 also supports user-operable components (not shown) on its generally rectangular periphery, such as volume control keys, shortcut keys, mute keys, data/power ports, earphone jacks, and the like. These user-operable components may be manipulated by a user to control operation of the electronic mobile device 100.

Turning now to FIGS. 5-10 and particularly FIG. 5, the guide mechanism 504 will now be described in further detail. The guide mechanism 504 includes a frame 512 that fixedly connects to the movable assembly 202 opposite the display 208. The frame 512 is a generally flat and rectangular panel and, in some embodiments, is a stamped stainless steel component. The frame 512 also includes features that facilitate motion of the movable assembly 202 as described above. In particular, the frame 512 includes a first mounting hole 514 that pivotally receives a guide follower 516 (e.g., a roller) and a second mounting hole 517 that pivotally receives a leg of an elastic member 518 (e.g., a torsion spring). The guide follower 516, the elastic member 518, and their interaction with the frame 512 will be described in further detail below.

In addition to the mounting holes 514 and 517, the frame 512 also includes a translation slot 520 that defines relatively-thin opposing tracks 522 on both sides of the slot 520. The tracks 522 mount a bushing guide or translation support 524 that is relatively movable within the slot 520. Adjacent the tracks 522, the slot 520 defines a wider opening 526 in which the translation support 524 is placed to engage the tracks 522 during assembly. After assembly and as the movable assembly 202 moves, however, the translation support 524 does not completely move to the opening 526 and remains at least partially engaged with the tracks 522 (see, e.g., FIG. 8).

Referring specifically to FIG. 5, the translation support 524 is a relatively flat and generally rectangular panel and, in some embodiments, is an injection molded stainless steel component. The translation support 524 also includes features that connect the movable assembly 202 and the base 206 and facilitate motion of the movable assembly 202 as described above. In particular, the translation support 524 includes oppositely facing channels 528 that translatably receive frame tracks 522. As such and as described above, the translation support 524 and the frame 512 (and therefore the movable assembly 202) are translatable relative to one another.

Figure 6:
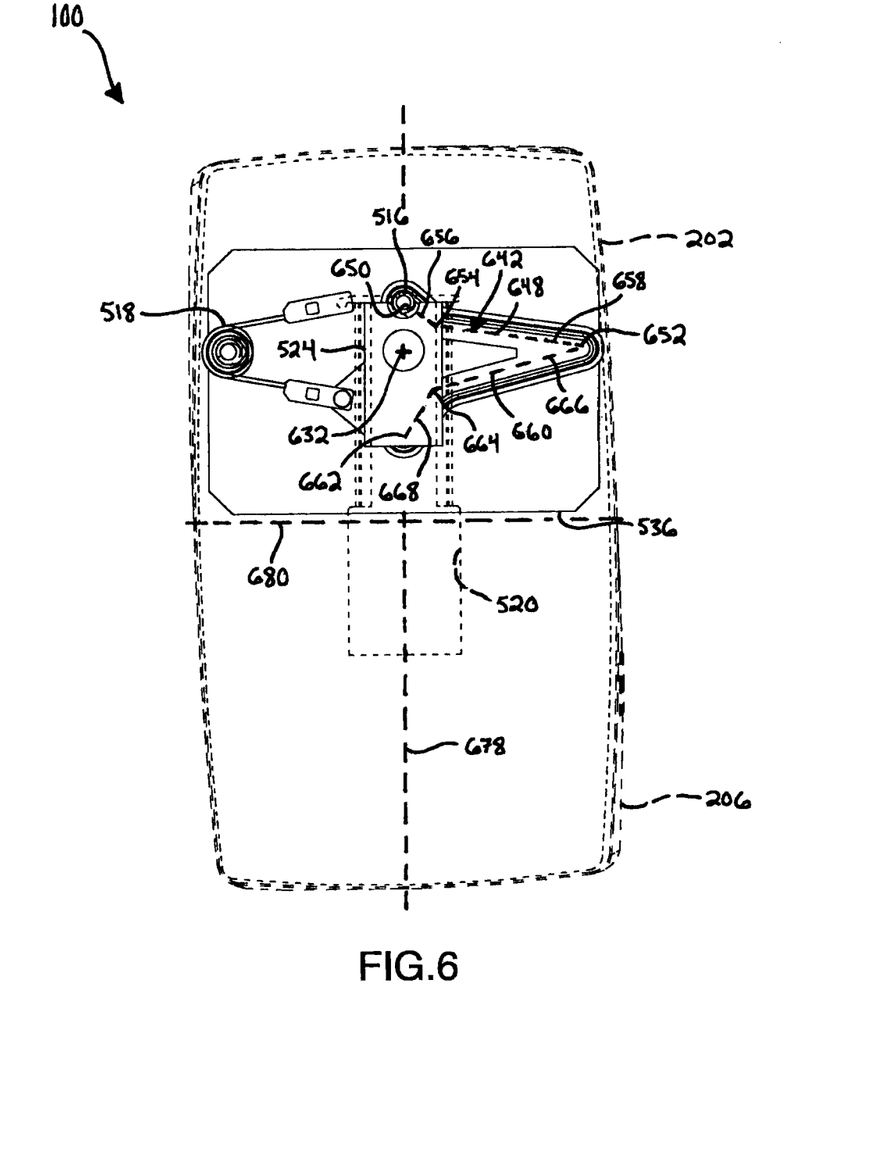
FIG. 6 is a front plan view of the guide mechanism in the compact operating configuration of FIG. 2.

Opposite the frame 512, the translation support 524 includes a circular mounting boss 530 that pivotally connects to the base 206. As such, the translation support 524 is pivotable relative to the base 206 about a pivot axis 632 (FIG. 6). Due to this pivotal connection to the base 206, the movable assembly 202 is both pivotable and translatable relative to the base 206.

In addition to the above components, the translation support 524 further includes a third mounting hole 534 that receives the other leg of the elastic member 518. The elastic member 518 thereby attempts to uncompress and maintain a relatively large distance between the second mounting hole 517 and the third mounting hole 534. Due to this action, the elastic member 518 facilitates movement of the movable assembly 202 to the various operating configurations as described in further detail below.

Turning again to FIGS. 5-10, the base 206 fixedly mounts a guide plate 536 that includes a fourth mounting hole 538 to pivotally mount the translation support 524. The guide plate 536 is a relatively flat and generally rectangular panel and, in some embodiments, is a stamped stainless steel component. In addition, the guide plate 536 includes a guide recess 540 that partially defines a guide path 642 (FIG. 6) traversed by the guide follower 516 as the movable assembly 202 moves relative to the base 206. The guide recess 540 also receives a guide rail 544 that further defines the guide path 642. The guide follower 516 rides on the guide rail 544; that is, the guide rail 544 is received between spaced-apart disks 546 of the follower 516.

The guide path 642 defined by the guide recess 540 and the guide rail 544 has a sideways-oriented general V-shape that surrounds the axis 632. The general V-shape includes a first leg or segment 648 (FIG. 6) of the guide path 642 traversed by the guide follower 516 as the movable assembly 202 moves from the compact operating configuration (FIG. 6) to the landscape operating configuration (FIG. 8).

As shown in the figures, the first segment 648 of the guide path 642 is shaped such that the elastic member 518 tends to hold the movable assembly 202 in a stable operating configuration (i.e., either the compact operating configuration or the landscape operating configuration). That is, the first segment 648 of the guide path 642 includes a first valley 650 at which the guide follower 516 is disposed when the movable assembly 202 is in the compact operating configuration (FIG. 6). The first valley 650 is disposed relatively far from the axis 632 compared to adjacent positions along the first segment 648. As such, when the guide follower 516 is disposed at the first valley 650, the elastic member 518 is compressed a minimum amount relative to adjacent positions along the guide path 642. Due to its tendency to uncompress, the elastic member 518 thereby attempts to hold the movable assembly 202 in the compact operating configuration.

Figure 8:
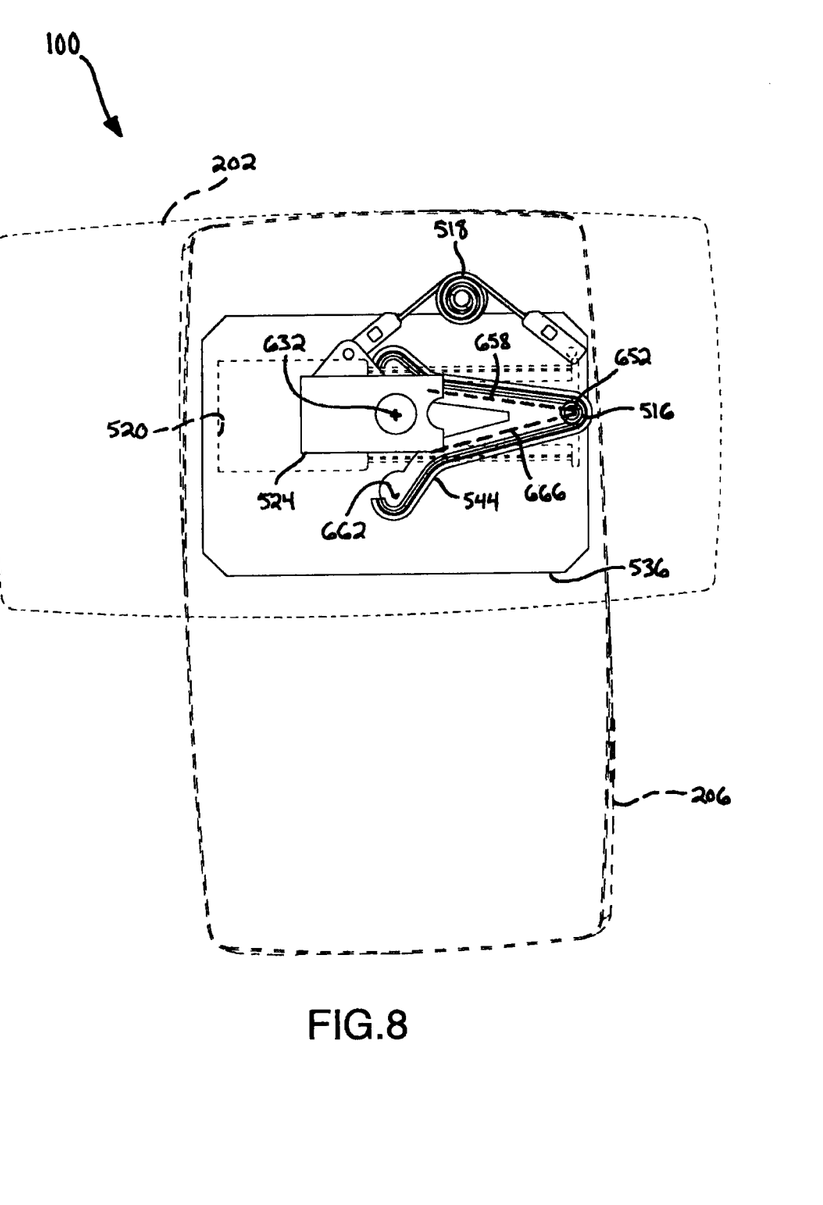
FIG. 8 is a front plan view of the guide mechanism in the landscape operating configuration of FIG. 3.

On the opposite end, the first segment 648 of the guide path 642 includes a second valley 652 at which the guide follower 516 is disposed when the movable assembly 202 is in the landscape operating configuration (FIG. 8). The second valley 652 is disposed relatively far from the axis 632 compared to adjacent positions along the first segment 648. As such, when the guide follower 516 is disposed at the second valley 652, the elastic member 518 is compressed a minimum amount relative to adjacent positions along the guide path 642. The elastic member 518 thereby attempts to hold the movable assembly 202 in the landscape operating configuration.

In order to bias the movable assembly 202 to either the compact operating configuration or the landscape operating configuration over the entire length of the first segment 648, the first segment 648 further includes a first apex 654 that defines a first buckling or unstable configuration (FIG. 7) between the compact operating configuration and the landscape operating configuration. The first apex 654 is disposed relatively near to the axis 632 and, when the guide follower 516 is disposed at the first apex 654, the elastic member 518 is compressed a maximum amount relative to adjacent positions along the guide path 642. As such, the tendency of the elastic member 518 to uncompress causes the movable assembly 202 to move away from the first buckling configuration.

Similarly, portions of the first segment 648 on opposite sides of the first apex 654 are shaped to continuously bias the guide follower 516 away from the first apex 654 and toward the nearest stable operating configuration. As used herein, the term "nearest stable operating configuration" and variations thereof refer to the operating configuration to which the movable assembly 202 can move without passing through a buckling configuration. In the case of the first segment 648, if the guide follower 516 is disposed along a first biasing or linear portion 656 of the guide path 642 to the left of the first apex 654, the nearest stable operating configuration is the compact operating configuration. If the guide follower 516 is disposed along a second biasing or linear portion 658 of the guide path 642 to the right of the first apex 654, the nearest stable operating configuration is the landscape operating configuration.

As shown most clearly in FIG. 6, the first linear portion 656 has a first length, the second linear portion 658 has a second length, and the second length is greater than the first length. This length of the second linear portion 658 permits the movable assembly 202 to translate relative to the translation support 524 over a relatively large distance when moving to and from the landscape operating configuration (FIG. 8). This in turn permits the device 100 to form a balanced T-shape at the landscape operating configuration. In addition, the first and second lengths may be selected such that in the first buckling configuration the movable assembly 202 is 45 degrees from the compact operating configuration. This construction advantageously biases the movable assembly 202 toward the compact operating configuration over half of the range of motion between the compact and landscape operating configurations and toward the landscape operating configuration over the other half of the range of motion.

Figure 10:
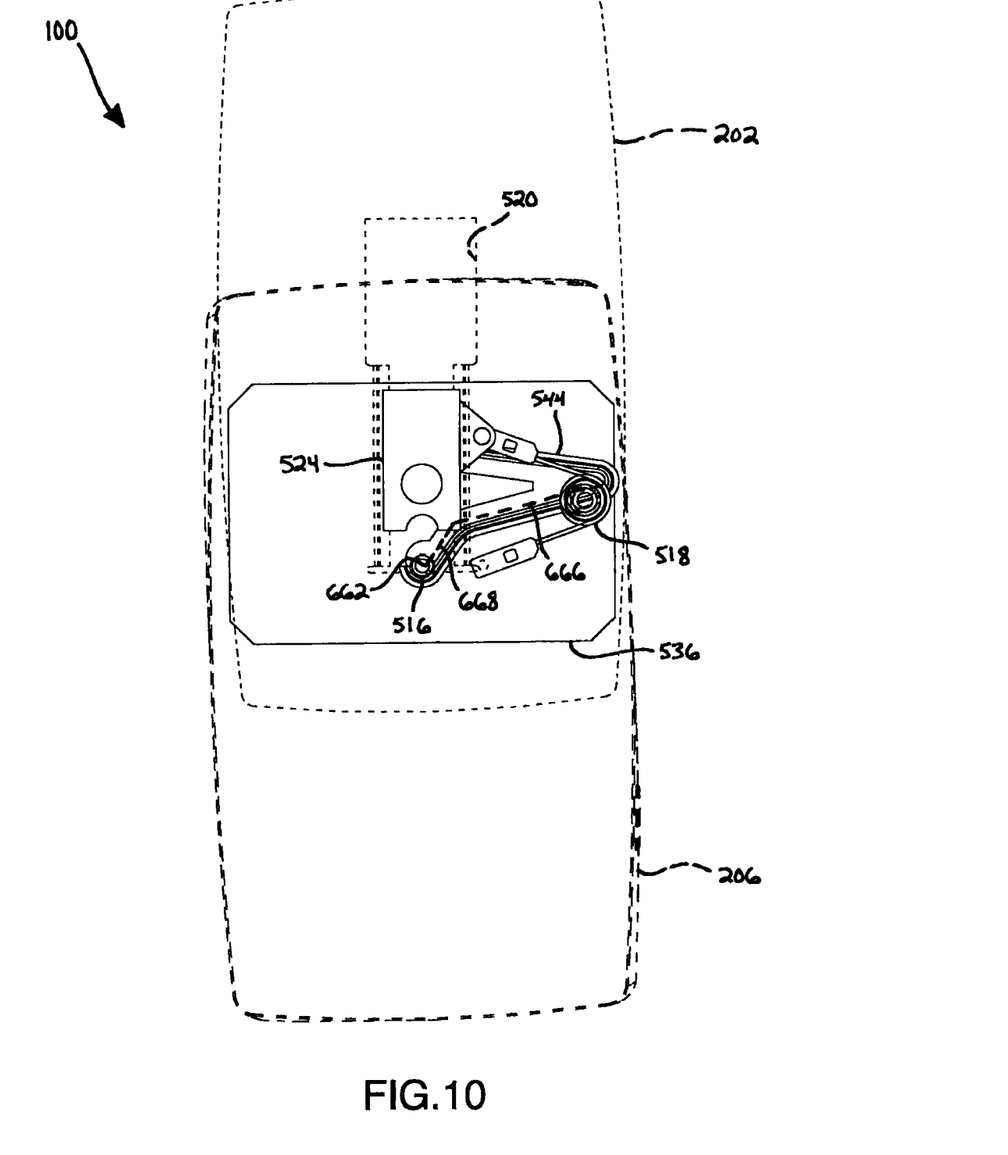
FIG. 10 is a front plan view of the guide mechanism in the extended operating configuration of FIG. 4.

In addition to the first segment 648, the general V-shape of the guide path 642 further includes a second leg or segment 660 (FIG. 6) traversed by the guide follower 516 as the movable assembly 202 moves from the landscape operating configuration (FIG. 8) to the extended operating configuration (FIG. 10).

Like the first segment 648, the second segment 660 of the guide path 642 is shaped such that the elastic member 518 tends to hold the movable assembly 202 in a stable operating configuration (i.e., either the landscape operating configuration or the extended operating configuration). That is, the second segment 660 of the guide path 642 shares the second valley 652 with the first segment 648. As described above, the guide follower 516 is disposed at the second valley 652 when the movable assembly 202 is in the landscape operating configuration (FIG. 8), and the elastic member 518 attempts to hold the movable assembly 202 in the landscape operating configuration.

On the opposite end, the second segment 660 of the guide path 642 includes a third valley 662 at which the guide follower 516 is disposed when the movable assembly 202 is in the extended operating configuration (FIG. 10). The third valley 662 is disposed relatively far from the axis 632 compared to adjacent positions along the second segment 660. As such, when the guide follower 516 is disposed at the third valley 662, the elastic member 518 is compressed a minimum amount relative to adjacent positions along the guide path 642. The elastic member 518 thereby attempts to hold the movable assembly 202 in the extended operating configuration.

In order to bias the movable assembly 202 to either the landscape operating configuration or the extended operating configuration over the entire length of the second segment 660, the second segment 660 further includes a second apex 664 that defines a second buckling or unstable configuration (FIG. 9) between the landscape operating configuration and the extended operating configuration. The second apex 664 is disposed relatively near to the axis 632 and, when the guide follower 516 is disposed at the second apex 664, the elastic member 518 is compressed a maximum amount relative to adjacent positions along the guide path 642. As such, the tendency of the elastic member 518 to uncompress causes the movable assembly 202 to move away from the second buckling configuration.

Similarly, portions of the second segment 660 on opposite sides of the second apex 664 are shaped to continuously bias the guide follower 516 away from the second apex 664 and toward the nearest stable operating configuration. In the case of the second segment 660, if the guide follower 516 is disposed along a third biasing or linear portion 666 of the guide path 642 to the right of the second apex 664, the nearest stable operating configuration is the landscape operating configuration. If the guide follower 516 is disposed along a fourth biasing or linear portion 668 of the guide path 642 to the left of the second apex 664, the nearest stable operating configuration is the extended operating configuration.

Figure 9:
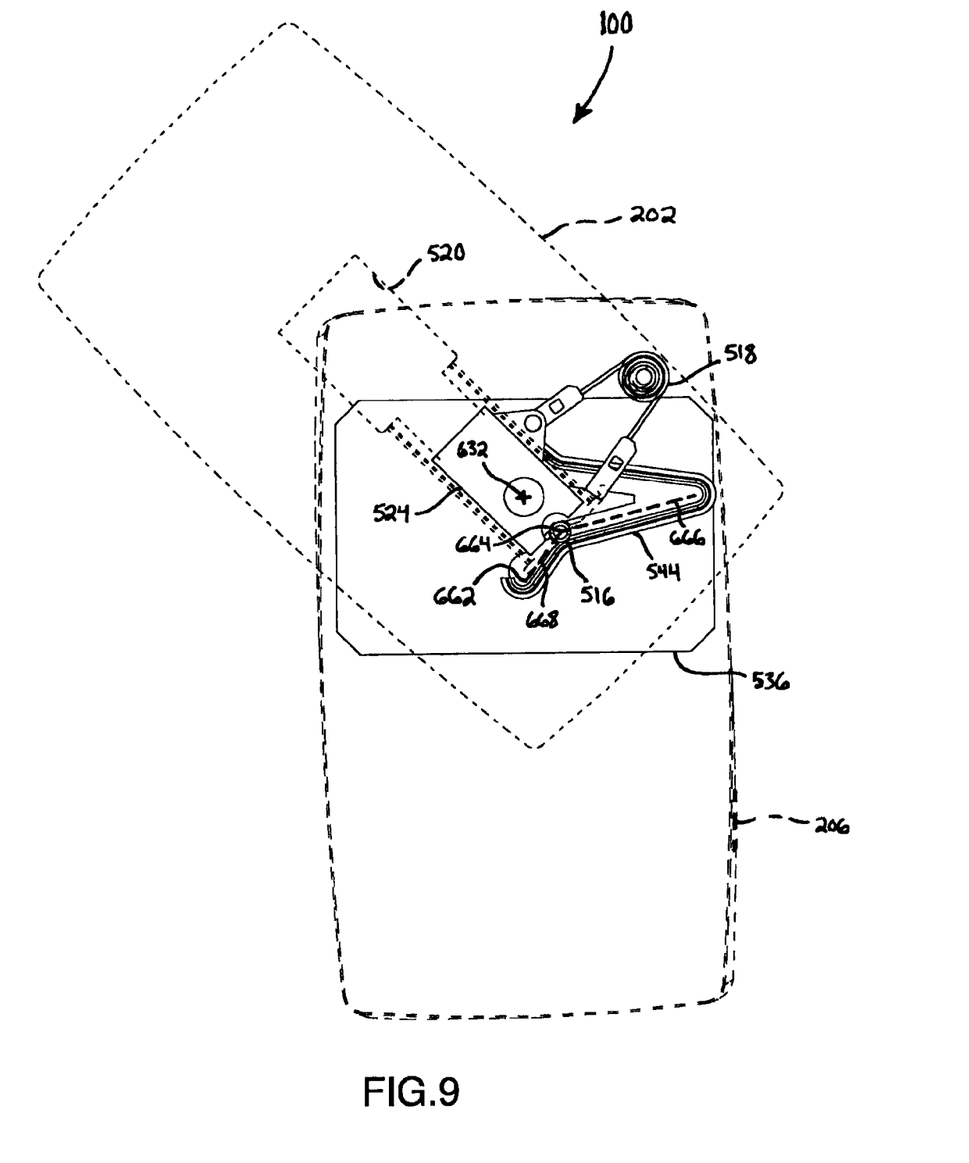
FIG. 9 is a front plan view of the guide mechanism in a second buckling configuration between the landscape operating configuration and the extended operating configuration.

As shown most clearly in FIGS. 8 and 9, the third linear portion 666 has a third length, the fourth linear portion 668 has a fourth length, and the fourth length is less than the third length. This length of the third linear portion 666 permits the movable assembly 202 to translate relative to the translation support 524 over a relatively large distance when moving to and from the landscape operating configuration (FIG. 8) as described above.

Also as shown most clearly in FIGS. 8 and 9, the third valley 662 is located further from the axis 632 than the first valley 650. As such, the movable assembly 202 overhangs the base 206 by a distance less than if the third valley 662 was the same distance from the axis 632 as the first valley 650. In addition, because the guide follower 516 is disposed further from the axis 632 in the extended operating configuration, less torque is transmitted to the translation support 524 if the device 100 is dropped and the movable assembly 202 strikes the ground or another object.

Referring now to FIGS. 2-4 and 6-10, the base 206 will now be described in further detail. The base 206 is a generally flat and rectangular component that houses communication elements and subsystems such as those described below in connection with FIG. 1.

A front surface 370 (FIG. 3) of the base 206 also supports a key assembly 372, which may be a virtual or a physical keyboard. The key assembly 372 includes a plurality of keys 374 that define a common keypad layout, such as a QWERTY layout, a QWERTZ layout, an AZERTY layout, a DVORAK layout, or the like. In some embodiments, the key assembly 372 also includes additional user-operable components, such as an optical trackpad 376, a track ball (not shown), a menu button (not shown), an escape button (not shown), and the like. In any case, the key assembly 372 may be manipulated by a user to control operation of the electronic mobile device 100.

In some embodiments, the base 206 also supports user-operable components on its rectangular periphery, such as volume control keys 273 (FIG. 2), shortcut keys 275, mute keys (not shown), data/power ports (not shown), earphone jacks (not shown), and the like, that may be manipulated by a user to control operation of the electronic mobile device 100.

The base 206 defines a longitudinal plane 678 (FIG. 6) that is generally perpendicular to the front surface 370 and extends in the direction of a larger dimension of the base 206 (e.g., the height direction). In some embodiments, the longitudinal plane 678 also bisects the base 206. The base 206 also defines a transverse plane 680 that is generally perpendicular to the front surface 370 and the longitudinal plane 678 and extends in the direction of a smaller dimension of the base 206

(e.g., the width direction). In some embodiments, the transverse plane 680 extends in the same direction that the V-shape of the guide path 642 opens. In some embodiments, the transverse plane 680 also bisects the base 206.

In the stable operating configurations, the movable assembly 202 is positioned relative to the planes 678, 680 defined in the base 206 as follows. In the compact operating configuration (FIGS. 2 and 6), the movable assembly 202 overlies the base 206 and conceals the key assembly 372. In the landscape operating configuration (FIGS. 3 and 8), a larger dimension of the movable assembly 202 (e.g., the height dimension) generally extends in the direction of the transverse plane 680 to reveal the key assembly 372. Stated another way, in the landscape operating configuration the movable assembly 202 is rotated substantially 90 degrees from the compact operating configuration. Moreover, due to the lengths of the second linear portion 658 and the third linear portion 666 of the guide path 642, the movable assembly 202 translates relative to the translation support 524 such that the movable assembly 202 and the base 206 define a general T-shape. In the extended operating configuration (FIGS. 4 and 10), the larger dimension of the movable assembly 202 generally extends in the direction of the longitudinal plane 678 and continues to reveal the key assembly 372. Stated another way, in the extended operating configuration the movable assembly 202 is rotated substantially 180 degrees from the compact operating configuration such that the movable assembly 202 and the base 206 define a general I-shape.

Figure 7:
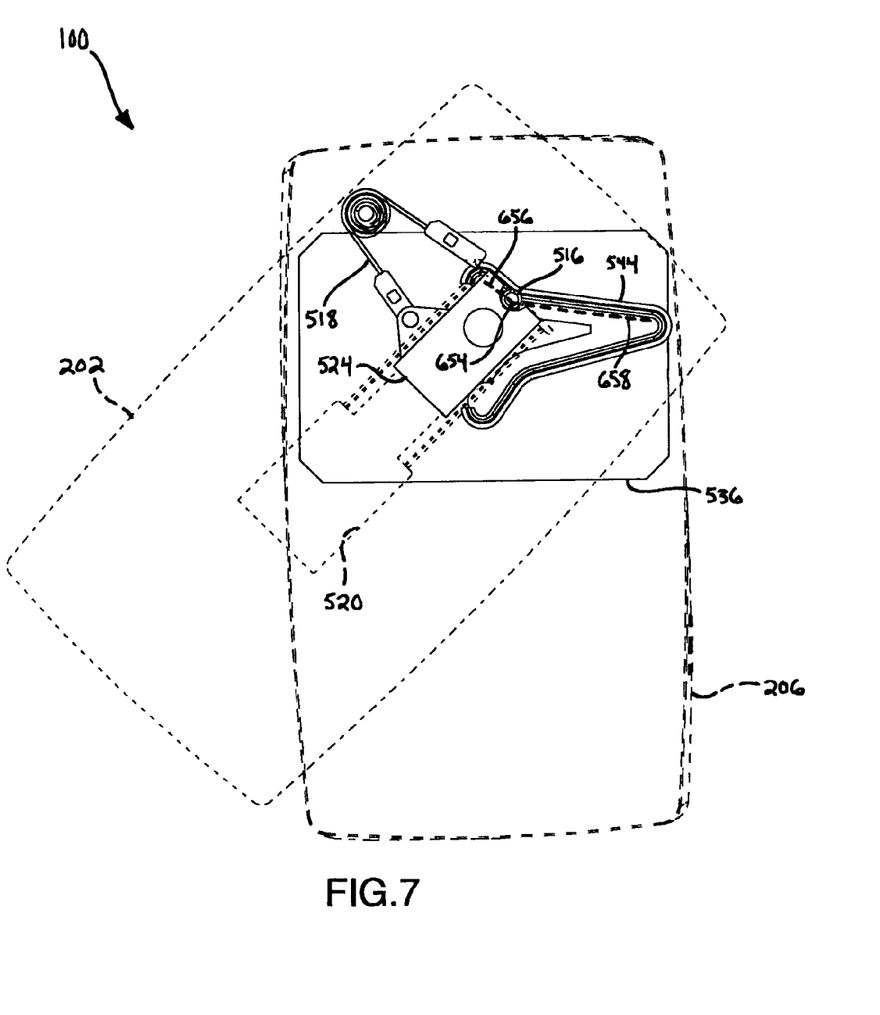
FIG. 7 is a front plan view of the guide mechanism in a first buckling configuration between the compact operating configuration and the landscape operating configuration.

To summarize, the guide mechanism 504 generally facilitates movement of the movable assembly 202 relative to the base 206 as follows. First referring to FIGS. 6 and 7, when a user pivots the movable assembly 202 from the compact operating configuration toward the landscape operating configuration, the guide follower 516 initially moves along the first linear portion 656 of the guide path 542 and is biased back towards the compact operating configuration until the guide follower 516 reaches the first apex 654. Referring to FIGS. 7 and 8, the guide follower 516 then moves along the second linear portion 658 and the elastic member 518 provides an "assist" to move the movable assembly 202 to the landscape operating configuration. Referring to FIGS. 8 and 9, when a user pivots the movable assembly 202 from the landscape operating configuration toward the extended operating configuration, the guide follower 516 initially moves along the third linear portion 666 and is biased back towards the landscape operating configuration until the guide follower 516 reaches the second apex 664. Referring to FIGS. 9 and 10, the guide follower 516 then moves along the fourth linear portion 668 and the elastic member 518 provides an assist to move the movable assembly 202 to the extended operating configuration. The guide mechanism 504 causes the movable assembly 202 to move in generally the opposite manner when moving from the extended operating configuration to the landscape operating configuration and then the compact operating configuration. In particular, the elastic member 518 provides an assist to move the movable assembly 202 to the landscape operating configuration when the guide follower 516 moves along the third linear portion 666 and to the compact operating configuration when the guide follower 516 moves along the first linear portion 656.

As the names imply, the device 100 is operable in each of the compact, landscape, and extended operating configurations. The compact operating configuration (FIGS. 2 and 6) may be useful for viewing relatively simple information, such as the identity of a person placing a call to the device 100 or SMS messages, and for storing the device 100. In embodiments in which the user interface device includes one or more input devices (e.g., touch-responsive displays, key assemblies, or the like), the compact operating configuration may also be useful for various other tasks, such as composing e-mail messages, placing phone calls, browsing the internet, using applications, and the like. The landscape operating configuration (FIGS. 3 and 8) may be useful for various tasks in which access to the key assembly 372 is preferred, such as composing e-mail messages, browsing landscape-oriented webpages, using landscape-oriented applications, and the like. Similarly, the extended operating configuration (FIGS. 4 and 10) may be useful for various tasks in which access to the key assembly 372 is preferred, such as browsing portrait-oriented webpages, using portrait-oriented applications, and the like. The extended operating configuration also provides an ergonomically appropriate position for conducting a voice call, and moving the movable assembly 202 to the extended operating configuration may be used to answer an incoming call instead of the key assembly 372. Each of the operating configurations may also be used for other tasks that are not explicitly described above.

The device 100 described above may be modified without departing from the scope of the disclosure. For example, the lengths of the linear portions 656, 658, 666, and 668 of the guide path 642 may differ from those shown in the figures so the apexes 654 and 664 are disposed in different locations and the buckling configurations would be at different angles of the movable assembly 202 relative to the base 206 than those shown in the figures. As another example, the guide path 642 could be completely defined by a recess in which the guide follower 516 moves instead of the guide rail 544, or the guide path 642 could be completely defined by an outwardly projection set of walls. As yet another example, the guide follower 516 could be a relatively simple component, such as a pin, that extends into the guide recess 540 to follow the guide path 642.

From the above description, it should be appreciated that the electronic mobile device 100 includes a simplified guide mechanism 504 that includes a translation support 524 that pivots relative to the base 206 about a fixed pivot axis 634 and a movable assembly 202 that simply translates relative to the translation support 524 as the translation support 524 pivots relative to the base 206. Moreover, the guide mechanism 504 defines a translation guide path 642 that is shaped such that an elastic member 518 biases the movable assembly 202 toward each of the operating configurations over at least some of the pivotal range of motion of the movable assembly 202 relative to the base 206.

Referring now to FIG. 1, a block diagram showing the operative connections of the communication elements and subsystems of the electronic mobile device 100 is illustrated. The electronic mobile device 100 includes a processing device 102, a communications subsystem 104, a short-range communications subsystem 106, input/output devices 208, 108, 110, 372, 210, 112, memory devices 114, 116, and various other device subsystems 118. The electronic mobile device 100 is preferably a two-way communication device having voice and data communication capabilities. In addition, the device 100 preferably has the capability to communicate with other computer systems via the internet.

The processing device 102 controls the overall operation of the electronic mobile device 100. Operating system software executed by the processing device 102 is preferably stored in a persistent store, such as the flash memory 114, but may also be stored in other types of memory devices, such as a read only memory (ROM) or similar storage elements. In addition, system software, specific device applications, or parts thereof, may be temporarily loaded into a volatile store, such as the random access memory (RAM) 116. Communication signals received by the electronic mobile device 100 may also be stored to RAM 116.

The processing device 102, in addition to its operating system functions, enables execution of software applications 114a-114n on the device 100. A predetermined set of applications that control basic device operations, such as data and voice communications 114a, 114b may be installed on the device 100 during manufacture. In addition, a personal information manager (PIM) application (not shown) may be installed during manufacture. The PIM is preferably capable of organizing and managing data items, such as e-mail, calendar events, voicemails, appointments, and task items. The PIM application is also preferably capable of sending and receiving data items via a wireless network 120. Preferably, the PIM data items are seamlessly integrated, synchronized and updated via the wireless network 120 with the device user's corresponding data items stored or associated with a host computer system. An example system and method for accomplishing these steps is disclosed in "System and Method for Pushing Information from a Host System to a Mobile Data Communication Device Having A Shared Electronic Address", U.S. Pat. No. 6,219,694, which is owned by the assignee of the present application, and which is incorporated herein by reference.

Communication functions, including data and voice communications, are performed through the communication subsystem 104, and possibly through the short-range communications subsystem 106. The communication subsystem 104 includes a receiver 122, a transmitter 124 and one or more antennas 126, 128. In addition, the communication subsystem 104 also includes a processing module, such as a digital signal processor (DSP) 130, and local oscillators (LOs) 132. The specific design and implementation of the communication subsystem 104 is dependent upon the communication network in which the electronic mobile device 100 is intended to operate. For example, an electronic mobile device 100 may include a communication subsystem 104 designed to operate with the Mobitex™, DataTAC™, or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the electronic mobile device 100.

Network access requirements vary depending upon the type of communication system. For example, in the Mobitex and DataTAC networks, electronic mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the electronic mobile device 100 may send and receive communication signals over the communication network 120. Signals received by the antenna 126 from the communication network 120 are routed to the receiver 122, which provides for signal amplification, frequency down conversion, filtering, channel selection, etc., and may also provide analog-to-digital conversion. Analog-to-digital conversion of the received signal allows the DSP to perform more complex communication functions, such as demodulation and decoding. In a similar manner, signals to be transmitted to the network 120 are processed (e.g., modulated and encoded) by the DSP 130 and are then provided to the transmitter 124 for digital-to-analog conversion, frequency up conversion, filtering, amplification and transmission to the communication network 120 (or networks) via the antenna 128.

In addition to processing communication signals, the DSP 130 provides for receiver 122 and transmitter 124 control. For example, gains applied to communication signals in the receiver 122 and transmitter 124 may be adaptively controlled through automatic gain control algorithms implemented in the DSP 130.

In a data communication mode, a received signal, such as a text message or web page download, is processed by the communication subsystem 104 and input to the processing device 102. The received signal is then further processed by the processing device 102 for output to the display 208, or alternatively to some other auxiliary I/O device 108. A device user may also compose data items, such as e-mail messages, using the key assembly 372 and/or some other auxiliary I/O device 108, such as the trackpad 376, a rocker switch, a thumb-wheel, or the like. The composed data items may then be transmitted over the communication network 120 via the communication subsystem 104.

In a voice communication mode, overall operation of the device is substantially similar to the data communication mode, except that received signals are output to the speaker 210, and signals for transmission are generated by a microphone 112. Alternative voice or audio I/O subsystems, such as a voice message recording subsystem, may also be implemented on the device 100. In addition, the display 208 may also be utilized in voice communication mode, for example to display the identity of a calling party, the duration of a voice call, or other voice call related information.

The short-range communications subsystem 106 enables communication between the electronic mobile device 100 and other proximate systems or devices, which need not necessarily be similar devices. For example, the short-range communications subsystem 106 may include an infrared device and associated circuits and components, or a Bluetooth™ communication module to provide for communication with similarly-enabled systems and devices.

The various embodiments presented above are merely examples and are in no way meant to limit the scope of this disclosure. Variations of the embodiments described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. An electronic mobile device, comprising:
   a base defining a guide path;
   a translation support pivotally supported by the base; and
   a movable assembly translatably connected to the translation support opposite the base and including a guide follower;
   wherein the guide follower follows the guide path such that the movable assembly translates relative to the translation support as the movable assembly and the translation support pivot relative to the base to move the movable assembly to a plurality of operating configurations relative to the base;

wherein the guide path includes a first segment along which the guide follower moves as the movable assembly moves from a compact operating configuration to a landscape operating configuration and vice versa, in the compact operating configuration the movable assembly overlying the base, and in the landscape operating configuration the movable assembly being positioned relative to the base such that the movable assembly and the base define a general T-shape;

further comprising an elastic member, wherein the first segment of the guide path includes a first apex that separates a first biasing portion of the first segment from a second biasing portion of the first segment, the elastic member biasing the movable assembly toward the compact operating configuration when the guide follower is disposed along the first biasing portion, and the elastic member biasing the movable assembly toward the landscape operating configuration when the guide follower is disposed along the second biasing portion.

2. The electronic mobile device of claim 1, wherein the guide follower is disposed at the first apex when the movable assembly is pivoted substantially 45 degrees from the compact operating configuration.

3. The electronic mobile device of claim 1, wherein the first biasing portion is linear and has a first length, the second biasing portion is linear and has a second length, and the second length is greater than the first length.

4. The electronic mobile device of claim 1, wherein the guide path includes a second segment along which the guide follower moves as the movable assembly moves from the landscape operating configuration to an extended operating configuration and vice versa, in the extended operating configuration the movable assembly being positioned relative to the base such that the movable assembly and the base define a general I-shape, and in the extended operating configuration the movable assembly revealing a portion of the base obscured by the movable assembly in the compact operating configuration.

5. The electronic mobile device of claim 4, further comprising an elastic member, wherein the second segment of the guide path includes a second apex that separates a third biasing portion of the second segment from a fourth biasing portion of the second segment, the elastic member biasing the movable assembly toward the landscape operating configuration when the guide follower is disposed along the third biasing portion, and the elastic member biasing the movable assembly toward the extended operating configuration when the guide follower is disposed along the fourth biasing portion.

6. The electronic mobile device of claim 4, wherein the portion of the base obscured by the movable assembly in the compact operating configuration is a key assembly.

7. The electronic mobile device of claim 4, further comprising an elastic member biasing the movable assembly to a nearest of the compact operating configuration, the landscape operating configuration, and the extended operating configuration.

8. The electronic mobile device of claim 7, wherein the elastic member connects to the translation support and the movable assembly such that the translation support and the guide follower are biased apart from each other.

9. The electronic mobile device of claim 1, wherein the movable assembly includes a slot through which the translation support translates relative to the movable assembly as the movable assembly and the translation support pivot relative to the base.

10. The electronic mobile device of claim 1, wherein the movable assembly includes a frame, and the guide follower is a roller rotatably supported by the frame.

11. The electronic mobile device of claim 1, wherein the movable assembly includes a user interface device facing away from the base.

12. The electronic mobile device of claim 11, wherein the movable assembly includes a display facing away from the base.

13. An electronic mobile device, comprising:
a base defining a guide path including a first linear portion, a second linear portion, a third linear portion, and a fourth linear portion;
a translation support pivotally supported by the base so as to pivot about an axis disposed between the first linear portion and the fourth linear portion; and
a movable assembly translatably connected to the translation support opposite the base and including a guide follower that follows the guide path such that the movable assembly translates relative to the translation support as the movable assembly and the translation support pivot relative to the base, the guide follower moving along:
the first linear portion when the movable assembly moves proximate a compact operating configuration;
one of the second linear portion and the third linear portion when the movable assembly moves proximate a landscape operating configuration;
the fourth linear portion when the movable assembly moves proximate an extended operating configuration; and
in the compact operating configuration the movable assembly overlying the base, in the landscape operating configuration the movable assembly being rotated substantially 90 degrees from the compact operating configuration, and in the extended operating configuration the movable assembly being rotated substantially 180 degrees from the compact operating configuration;
further comprising an elastic member connected to the translation support and the movable assembly, the elastic member biasing the movable assembly toward the compact operating configuration when the guide follower is disposed along the first linear portion, the elastic member biasing the movable assembly toward the landscape operating configuration when the guide follower is disposed along one of the second linear portion and the third linear portion, and the elastic member biasing the movable assembly toward the extended operating configuration when the guide follower is disposed along the fourth linear portion.

14. An electronic mobile device, comprising:
a base including:
a front surface;
a longitudinal plane generally perpendicular to the front surface and extending in a height direction of the base;
a transverse plane generally perpendicular to the front surface and the longitudinal plane;
a guide path defined by the front surface and having a general V-shape opening in a direction generally parallel to the transverse plane, the guide path including a first linear portion, a second linear portion, a third linear portion, and a fourth linear portion;
a movable assembly movably supported by the base and having a rear surface that faces the front surface of the base and supports a guide follower that follows the guide path as the movable assembly moves relative to the base, the guide follower moving along:
- the first linear portion when the movable assembly moves proximate a compact operating configuration;
- one of the second linear portion and the third linear portion when the movable assembly moves proximate a landscape operating configuration;
- the fourth linear portion when the movable assembly moves proximate an extended operating configuration;

in the compact operating configuration the movable assembly overlying the base and extending along the longitudinal plane, in the landscape operating configuration the movable assembly extending in a direction generally parallel to the transverse plane, in the extended operating configuration the movable assembly extending along the longitudinal plane and being rotated substantially 180 degrees from the compact operating configuration;

further comprising an elastic member connected to the movable assembly, the elastic member biasing the movable assembly toward the compact operating configuration when the guide follower is disposed along the first linear portion, the elastic member biasing the movable assembly toward the landscape operating configuration when the guide follower is disposed along one of the second linear portion and the third linear portion, and the elastic member biasing the movable assembly toward the extended operating configuration when guide follower is disposed along the fourth linear portion.

15. The electronic mobile device of claim 14, wherein the first linear portion and the second linear portion define a first segment of the guide path, the first segment further including a first apex disposed between the first linear portion and the second linear portion, and the guide follower is disposed at the first apex when the movable assembly is in a first buckling configuration between the compact operating configuration and the landscape operating configuration.

16. The electronic mobile device of claim 15, wherein the third linear portion and the fourth linear portion define a second segment of the guide path, the second segment further including a second apex disposed between the third linear portion and the fourth linear portion, and the guide follower is disposed at the second apex when the movable assembly is in a second buckling configuration between the landscape operating configuration and the extended operating configuration.

* * * * *